(12) United States Patent
Kim et al.

(10) Patent No.: US 12,444,736 B2
(45) Date of Patent: Oct. 14, 2025

(54) NEGATIVE ACTIVE MATERIAL AND RECHARGEABLE LITHIUM BATTERY INCLUDING SAME

(71) Applicant: SAMSUNG SDI CO., LTD., Yongin-si (KR)

(72) Inventors: Hyejin Kim, Yongin-si (KR); Pil Jin Yoo, Yongin-si (KR); Deok-Hyun Kim, Yongin-si (KR); Youngugk Kim, Yongin-si (KR); Jaehou Nah, Yongin-si (KR); Ilyoung Choi, Yongin-si (KR); Eunji Kang, Yongin-si (KR); Sunil Park, Yongin-si (KR); Jaewon Kim, Yongin-si (KR); Doori Oh, Yongin-si (KR); Yookyung Kim, Yongin-si (KR); Narae Kim, Yongin-si (KR); Banseok Lee, Yongin-si (KR)

(73) Assignee: SAMSUNG SDI CO., LTD., Yongin-si (KR)

( * ) Notice: Subject to any disclaimer, the term of this patent is extended or adjusted under 35 U.S.C. 154(b) by 17 days.

(21) Appl. No.: 18/383,082

(22) Filed: Oct. 24, 2023

(65) Prior Publication Data

US 2025/0023034 A1  Jan. 16, 2025

(30) Foreign Application Priority Data

Jul. 5, 2023 (KR) ........................ 10-2023-0087378

(51) Int. Cl.
*H01M 4/38* (2006.01)
*H01M 4/36* (2006.01)
(Continued)

(52) U.S. Cl.
CPC ............ *H01M 4/386* (2013.01); *H01M 4/366* (2013.01); *H01M 4/583* (2013.01); *H01M 4/62* (2013.01);
(Continued)

(58) Field of Classification Search
CPC ....... H01M 4/366; H01M 4/386; H01M 4/583
See application file for complete search history.

(56) References Cited

U.S. PATENT DOCUMENTS 10,714,741 B2 * 7/2020 Choi ..................... H01M 4/133
11,611,071 B2 * 3/2023 Costantino .......... H01M 4/1393
(Continued)

FOREIGN PATENT DOCUMENTS

CN  108511719 A  *  9/2018  ........ H01M 10/0525
CN  108832077 A  *  11/2018  ........ H01M 10/0525
(Continued)

OTHER PUBLICATIONS

Machine translation of CN-112201791 (no date) (Year: 0000).*
(Continued)

*Primary Examiner* — Amanda C. Walke
(74) *Attorney, Agent, or Firm* — Lee IP Law, P.C.

(57) ABSTRACT

A negative active material includes a core having a silicon-carbon composite and a polymer coating layer formed on the core, wherein the negative active material has about 1.02 to about 1.6 of a ratio of height of N1s peak occurring at about 400±about 0.5 eV relative to a height of N1s peak occurring at about 405±about 0.5 eV of a bonding energy, and about 1.02 to about 3.0 of a ratio of a height of C1s peak occurring at about 286.5±about 0.5 eV relative to a height of C1s peak occurring at about 290±about 0.5 eV when an X-ray photoelectron spectroscopy (XPS) is measured.

15 Claims, 4 Drawing Sheets

(51) Int. Cl.
- *H01M 4/583* (2010.01)
- *H01M 4/62* (2006.01)
- *H01M 10/0525* (2010.01)
- *H01M 10/44* (2006.01)
- *H01M 4/02* (2006.01)

(52) U.S. Cl.
CPC ....... *H01M 10/0525* (2013.01); *H01M 10/44* (2013.01); *H01M 2004/021* (2013.01); *H01M 2004/027* (2013.01)

(56) References Cited

U.S. PATENT DOCUMENTS

| | | |
|---|---|---|
| 2018/0219216 A1 | 8/2018 | Choi et al. |
| 2019/0006679 A1 | 1/2019 | Jeong et al. |
| 2023/0307619 A1* | 9/2023 | Won .................... H01M 4/0419 |
| 2024/0356041 A1* | 10/2024 | Won .................... H01M 4/628 |

FOREIGN PATENT DOCUMENTS

| | | | | |
|---|---|---|---|---|
| CN | 110165187 A | * | 8/2019 | ........ H01M 10/0525 |
| CN | 112201791 A | * | 1/2021 | ........ H01M 10/0525 |
| CN | 115084467 A | * | 9/2022 | ........ H01M 10/0525 |
| JP | 2017183051 A | * | 10/2017 | ............ Y02E 60/10 |
| KR | 2016149862 A | * | 12/2016 | .......... H01M 10/052 |
| KR | 2017048184 A | * | 5/2017 | ........ H01M 10/0525 |
| KR | 10-2017-0134134 A | | 12/2017 | |
| KR | 10-2022-0026768 A | | 3/2022 | |
| KR | 10-2448299 B1 | | 9/2022 | |
| KR | 10-2523705 B1 | | 4/2023 | |
| WO | WO 2022-196934 A1 | | 9/2022 | |

OTHER PUBLICATIONS

ACS Applied Materials Interfaces 2016, vol. 8, pp. 2899-2904. See pp. 2899-2901, Figure 2, Supporting information S-1. (Year: 2016).*

Royal Society of Chemistry 2016, vol. 6, pp. 68371-68378. See pp. 68371, 68372, 68373. (Year: 2016).*

Yitian Bie, et al., "Polydopamine Wrapping Silicon Cross-linked with Polyacrylic Acid as High-Per formance Anode for Lithium-Ion Batteries", ACS Applied Materials & Interfaces 2016, 8, 5, 2899-2904.

* cited by examiner

NEGATIVE ACTIVE MATERIAL AND RECHARGEABLE LITHIUM BATTERY INCLUDING SAME

CROSS-REFERENCE TO RELATED APPLICATION

This application claims priority to and the benefit of Korean Patent Application No. 10-2023-0087378, filed in the Korean Intellectual Property Office on Jul. 5, 2023, the entire contents of which are incorporated herein by reference.

BACKGROUND

1. Field

Embodiments of this disclosure relate to a negative active material and a rechargeable lithium battery including the same.

2. Description of the Related Art

Electronic devices, e.g., mobile phones, laptop computers, and electric vehicles, using batteries increase the demand for rechargeable batteries with relatively high capacity and lighter weight. For example, the demand for rechargeable batteries with high energy density may require high-capacity negative active materials, e.g., Si-based negative active materials.

SUMMARY

One or more embodiments provide a negative active material including a core having a silicon-carbon composite, and a polymer coating layer formed on the core, wherein the negative active material has about 1.02 to about 1.6 of a ratio of height of a N1s peak occurring at about 400±about 0.5 eV relative to a height of a N1s peak occurring at about 405±about 0.5 eV, and about 1.02 to about 3.0 of a ratio of a height of a C1s peak occurring at about 286.5±about 0.5 eV relative to a height of a C1s peak occurring at about 290±about 0.5 eV when an X-ray photoelectron spectroscopy (XPS) is measured.

BRIEF DESCRIPTION OF THE DRAWINGS

Features will become apparent to those of skill in the art by describing in detail exemplary embodiments with reference to the attached drawings, in which.

DETAILED DESCRIPTION

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. In addition, it will also be understood that when a layer is referred to as being "between" two layers, it can be the only layer between the two layers, or one or more intervening layers may also be present. Like reference numerals refer to like elements throughout.

Terms used in the specification are used to explain embodiments, but are not intended to limit. Expressions in the singular also include expressions in plural unless the context clearly dictates otherwise. Further, the term "combination thereof" may include a mixture, a laminate, a complex, a copolymer, an alloy, a blend, a reactant of constituents.

The terms "comprise", "include" or "have" are intended to designate that the performed characteristics, numbers, step, constituted elements, or a combination thereof is present, but it should be understood that the possibility of presence or addition of one or more other characteristics, numbers, steps, constituted element, or a combination are not to be precluded in advance.

In addition, herein, "layer" includes a shape totally formed on the entire surface or a shape partial surface, when viewed from a plane view.

Herein, "or" is not to be construed as an exclusive meaning, for example, "A or B" is construed to include A, B, A+B, and the like.

As used herein, when a definition is not otherwise provided, a particle diameter or size may be an average particle diameter. The average particle diameter indicates an average value of particle diameter depending on the cumulative volume in a particle size distribution of the particle included in the negative active material. The particle size (D50) may be measured by a method well known to those skilled in the art, e.g., by a particle size analyzer, or by a transmission electron microscopic image, or a scanning electron microscopic image. Alternatively, a dynamic light-scattering measurement device is used to perform a data analysis, and the number of particles is counted for each particle size range, and from this, the average particle diameter (D50) value may be easily obtained through a calculation.

A negative active material according to one or more embodiments includes a core having a silicon-carbon composite and a polymer coating layer formed on the core.

In one or more embodiments, the negative active material may have about 1.02 to about 1.6 of a ratio of height of N1s peak occurring at about 400±about 0.5 eV, relative to a height of N1s peak occurring at which a bonding energy is about 405±about 0.5 eV, and about 1.02 to about 3.0 of a ratio of a height of C1s peak occurring at about 286.5±about 0.5 eV relative to a height of C1s peak occurring at about 290±about 0.5 eV when an X-ray photoelectron spectroscopy (XPS) is measured.

The ratio of height of a N1s peak occurring at about 400±about 0.5 eV relative to a height of a N1s peak occurring at about 405±about 0.5 eV may be about 1.03 to about 1.5, about 1.04 to about 1.4, about 1.1 to about 1.4, or about 1.3 to about 1.4.

The ratio of a height of a C1s peak occurring at about 286.5±about 0.5 eV relative to a height of a C1s peak occurring at about 290±about 0.5 eV may be about 1.03 to about 2.7, or may be about 1.05 to about 2.5.

An XPS measurement result of the negative active material depends on a structure of the polymer coating layer positioned on a surface thereof, and the XPS measurement result satisfying into the range indicates that the polymer coating layer has a cross-linking structure.

As such, the polymer coating layer according to one or more embodiments has a cross-linking structure, which is unable to dissolve in water. Thus, the negative active material including the polymer coating layer may be suitably applicable to an aqueous system. If a negative active material, even with the same composition, which does not have a cross-linking structure in the polymer coating layer, is added to water, the polymer coating layer may be dissolved in water and removed. Thus, it may not be used in an environmentally friendly aqueous system.

The negative active material according to one or more embodiments may have a C—H peak appearing at a wavelength of about 2940 cm$^{-1}$ to about 3000 cm$^{-1}$, a C—O first peak appearing at a wavelength of about 980 cm$^{-1}$ to about 990 cm$^{-1}$, a C—O second peak occurring at about 1150 cm$^{-1}$ to about 1200 cm 1 in a FT-IR analysis graph. The appearance of the peaks in the FT-IR analysis graph indicates that the polymer coating layer has a cross-linking structure.

The polymer coating layer according to one or more embodiments exhibits electrical insulation and may secure resistance to electrolyte dissolution, and the polymer coating layer may prevent contact between the core including the silicon-carbon composite and an electrolyte, thereby effectively suppressing a side reaction with the electrolyte. Thus, the cycle-life characteristic may be improved. The polymer coating layer according to one or more embodiments may readily pass lithium ions and may readily move electrons, thereby improving efficiency during charging and discharging.

In the negative active material according to one or more embodiments, the polymer coating layer may be positioned on the surface of the core, and a thickness of the polymer coating layer may be about 1 nm to about 10 nm, about 2 nm to about 8 nm, or about 3 nm to about 6 nm. If the thickness of the polymer coating layer is within the above range, lithium ion and electron movements may be well maintained, a side reaction with the electrolyte may be effectively suppressed, and the electron movement from the collector to the negative active material may appropriately occur.

An amount of the polymer coating layer may be about 0.1 wt % to about 5 wt % based on a total 100 wt % of the negative active material, about 0.2 wt % to about 2 wt %, or about 1 wt % to about 1.5 wt %. If the amount of the polymer coating layer is within the above range, lithium ion and electron movements may be well maintained and the side reaction with the electrolyte may be effectively suppressed.

The polymer coating layer according to one or more embodiments may include a cross-linked polymer of a phenol group-included first repeating unit and an amine group-included second repeating unit.

The phenol group-included first repeating unit may be derived from a phenol compound with two or three OH groups, which renders to have excellent adsorption. The phenol compound serves to enhance adherence, and may include, e.g., pyrogallol, catechol, resorcinol, hydroquinone, phloroglucinol, or a combination thereof.

The amine group-included second repeating unit may be derived from an amine compound with three or more amine groups, and the amine compound may be a compound which may be polymerized with an OH group to become a polymer. In the amine compound, three or more amine groups are sufficient so that there is no need to limit the maximum value. Examples of the amine compound may include diethylenetriamine, triethylenetetramine, polyethyleneimine, or a combination thereof.

In the negative active material according to one or more embodiments, the silicon-carbon composite, which is the core, may include silicon nano particles and an amorphous carbon coating layer positioned on the surface of the silicon nano particles. The silicon-carbon composite may also include an agglomerated product in which silicon nano particles are agglomerated and an amorphous carbon coating layer positioned on the surface of the agglomerated product.

The silicon nano particles may have a particle diameter of about 10 nm to about 1,000 nm, e.g., about 10 nm to about 200 nm or about 20 nm to about 150 nm. If the particle diameter of the silicon nano particle is within the above range, the volume expansion caused during charge and discharge may be suppressed, and a breakage of the conductive path due to crushing of particle may be prevented.

In the amorphous carbon coating layer, amorphous carbon may be soft carbon, hard carbon, mesophase pitch carbide, sintered cokes, or a combination thereof. The amorphous carbon coating layer may have a thickness of about 1 nm to about 2 μm, about 1 nm to about 500 nm, about 10 nm to about 300 nm, or about 20 nm to about 200 nm. If the thickness of the amorphous carbon coating layer is within the above range, the volume expansion of silicon during charging and discharging may be well suppressed.

The silicon-carbon composite may further include crystalline carbon. If the silicon-carbon composite further includes crystalline carbon, an agglomerated product in which silicon nano particles and crystalline carbon are agglomerated and an amorphous carbon coating layer positioned on the surface of the agglomerated product, may be included. Examples of shapes of the crystalline carbon may include an unspecified shape, a sheet, a flake, a spherical or fiber shaped natural graphite or artificial graphite, or a combination thereof.

If the silicon-carbon composite includes silicon nano particles and an amorphous carbon coating layer, based on a total 100 wt % of the silicon-carbon composite, an amount of the silicon nano particles may be about 30 wt % to about 70 wt %, e.g., about 40 wt % to about 65 wt %. An amount of the amorphous carbon coating layer may be, based on a total 100 wt % of the silicon-carbon composite, about 30 wt % to about 70 wt %, e.g., about 35 wt % to about 60 wt %.

If the silicon-carbon composite further includes crystalline carbon, based on a total 100 wt % of the silicon-carbon composite, an amount of the silicon nano particles may be about 20 wt % to about 70 wt %, e.g., about 25 wt % to about 65 wt %. Based on a total 100 wt % of the silicon-carbon composite, an amount of amorphous carbon may be about 25 wt % to about 70 wt %, e.g., about 25 wt % to about 60 wt %, and an amount of crystalline carbon may be about 1 wt % to about 20 wt %, e.g., about 5 wt % to about 15 wt %.

<Method of Preparing Negative Active Material>

The negative active material according to one or more embodiments may be prepared by mixing the silicon-carbon composite, a phenol compound with two or three OH groups, and an amine compound with three or more amine groups to prepare a mixture and heat-treating the mixture. Hereinafter, each process will be described in more detail.

The mixing process may be performed under a wet process by using a solvent, and this may provide a more uniform mixing. The mixing process may be carried out by further using a dispersant. If the dispersant agent is further used in the mixing process, the silicon-carbon composite, the phenol compound, and the amine compound may be more uniformly dispersed. The dispersant may include, e.g., cetrimonium bromide, sodium dodecyl sulfate, Triton X-100, or a combination thereof.

The mixing process may include adding the phenol compound to the silicon-carbon composite to prepare a first mixture, followed by adding the amine compound to the first mixture. If the dispersant is used, before adding the phenol compound, an addition of the dispersing agent to the silicon-carbon composite may be carried out.

According to this process, the phenol compound may be adsorbed to the silicon-carbon composite and the addition of the amine compound may cause the polymerization of the phenol compound and the amine compound. This may form a polymer coating layer in which the phenol compound is polymerized with the amine compound on the surface of the silicon-carbon composite.

In the mixing process, a buffer may be added. The buffer may include tris buffer, phosphate buffer, TEA buffer, or a combination thereof. The tris buffer may be prepared by adding tris(hydroxymethyl)aminomethane in water. The phosphate buffer may be sodium phosphate buffer or potassium phosphate buffer. The TEA buffer may be tris base, acetic acid, and EDTA (ethylene-diamine-tetra acetic acid).

In the mixing process, used amounts of the silicon-carbon composite, the phenol compound, and the amine compound may be adjusted so that an amount of the silicon-carbon composite may be about 99.5 wt % to about 95 and an amount of the polymer coating layer may be about 0.5 wt % to about 5 wt %, based on a total 100 wt % of the negative active material, in the desired negative active material.

For example, in the mixing process, mixing after adding the amine compound may be carried out for about 10 minutes to about 15 hours. In another example, the mixing time may be suitably adjusted according to the used amounts of the phenol compound and the amine compound.

The final mixture obtained from the mixing process is heat-treated. In the heat-treatment, a cross-linking reaction of the phenol compound and the amine compound may occur, resulting in a polymer coating layer with a cross-linking structure on a surface of the silicon-carbon composite.

The cross-linking reaction according to one or more embodiments is illustrated with, e.g., a pyrogallol and a polyethylene imine compound, as shown in the reaction scheme 1 below.

[Reaction scheme 1]

Heat-tareatment

The heat-treatment may be performed at about 100° C. to about 200° C. If the heat-treatment is performed at the above temperature range, the cross-linking reaction may appropriately occur. The preparation of the polymer coating layer with the cross-linked structure necessarily requires the heat-treatment. If the heat-treatment is not performed, it is not desirable that a polymer coating layer polymerizes by the phenol compound and the amine compound, but without a cross-linked structure on a surface of the silicon-carbon composite. The heat-treatment may be carried out under, e.g., an air atmosphere, a vacuum atmosphere, a nitrogen atmosphere, or an argon atmosphere, but is not limited thereto.

<Rechargeable Lithium Battery>

Another embodiment provides a rechargeable lithium battery including a negative electrode, a positive electrode, and an electrolyte.

The negative electrode may include a current collector and a negative active material layer formed on the current collector and including the negative active material described previously.

The negative active material according to one or more embodiments may be included as a first negative active material and crystalline carbon may be included as a second negative active material. A mixing ratio of the first negative active material and the second negative active material may be a weight ratio of about 20:80 to about 10:90. In another embodiments, the negative active material may include the first negative active material and the second negative active material at a weight ratio of about 18:82 to about 12:88.

In the negative active material layer, the amount of the negative active material may be about 95 wt % to about 98 wt % based on a total 100 wt % of the negative active material layer.

The negative active material layer may include a binder, and may further include a conductive material. An amount of the binder may be about 1 wt % to about 5 wt % based on a total 100 wt % of the negative active material layer. An amount of the conductive material may be about 1 wt % to about 5 wt % based on a total 100 wt % of the negative active material layer.

The binder improves binding properties of negative active material particles with one another and with a current collector. The binder may be a non-aqueous binder, an aqueous binder, or a combination thereof.

Examples of the non-aqueous binder may include an ethylene propylene copolymer, polyacrylonitrile, polystyrene, polyvinylchloride, carboxylated polyvinylchloride, polyvinyl fluoride, polyurethane, polytetrafluoroethylene, polyvinylidene fluoride, polyethylene, polypropylene, polyamide imide, polyimide, or combinations thereof.

Examples of the aqueous binder may include a styrene-butadiene rubber, an acrylated styrene-butadiene rubber (ABR), an acrylonitrile-butadiene rubber, an acrylic rubber, a butyl rubber, a fluorine rubber, an ethylene oxide-containing polymer, polyvinyl pyrrolidone, polypropylene, polyepichlorohydrin, polyphosphazene, an ethylene propylene diene copolymer, polyvinyl pyridine, chlorosulfonated polyethylene, latex, a polyester resin, an acrylic resin, a phenol resin, an epoxy resin, polyvinyl alcohol, or a combination thereof.

If the aqueous binder is used as a negative electrode binder, a cellulose-based compound may be further used to provide viscosity as a thickener. The cellulose-based compound includes one or more of, e.g., carboxymethyl cellulose, hydroxypropylmethyl cellulose, methyl cellulose, or alkali metal salts thereof. The alkali metal may be, e.g., Na, K, or Li. The thickener may be included in an amount of about 0.1 parts by weight to about 3 parts by weight, based on 100 parts by weight of the negative active material.

The conductive material is included to provide electrode conductivity, and any suitable electrically conductive material may be used as a conductive material unless it causes a chemical change. Examples of the conductive material may include a carbon-based material, e.g., natural graphite, artificial graphite, carbon black, acetylene black, ketjen black, a carbon fiber, and the like, a metal-based material of a metal powder or a metal fiber including copper, nickel, aluminum, silver, and the like, a conductive polymer, e.g., a polyphenylene derivative, or a mixture thereof.

The current collector may include one selected from a copper foil, a nickel foil, a stainless steel foil, a titanium foil, a nickel foam, a copper foam, a polymer substrate coated with a conductive metal, and a combination thereof.

The positive electrode may include a current collector and a positive active material layer formed on the current collector.

The positive electrode active material may include lithiated intercalation compounds that reversibly intercalate and deintercalate lithium ions. In some embodiments, one or more composite oxides of a metal selected from cobalt, manganese, nickel, and a combination thereof, and lithium, may be used. For example, the compounds represented by one of the following chemical formulae may be used: $Li_aA_{1-b}X_bD^1_2$ ($0.90 \leq a \leq 1.8$, $0 \leq b \leq 0.5$); $Li_aA_{1-b}X_bO_{2-c1}D^1_{c1}$ ($0.90 \leq a \leq 1.8$, $0 \leq b \leq 0.5$, $0 < c1 \leq 0.05$); $Li_aE_{1-b}X_bO_{2-c1}D^1_{c1}$ ($0.90 \leq a \leq 1.8$, $0 \leq b \leq 0.5$, $0 \leq c1 \leq 0.05$); $Li_aE_{2-b}X_bO_{4-c1}D^1_{c1}$ ($0.90 \leq a$ $1.8$, $0 \leq b \leq 0.5$, $0 \leq c1 \leq 0.05$); $Li_aNi_{1-b-c}Co_bX_cD^1_\alpha$ ($0.90 \leq a \leq 1.8$, $0 \leq b \leq 0.5$, $0 \leq c \leq 0.5$, $0 \leq \alpha \leq 2$); $Li_aNi_{1-b-c}Co_bX_cO_{2-\alpha}T_\alpha$ ($0.90 \leq a \leq 1.8$, $0 \leq b \leq 0.5$, $0 \leq c \leq 0.5$, $0 \leq \alpha \leq 2$); $Li_aNi_{1-b-c}Co_bX_cO_{2-\alpha}T_2$ ($0.90 \leq a \leq 1.8$, $0 \leq b \leq 0.5$, $0 \leq c \leq 0.5$, $0 \leq \alpha \leq 2$); $Li_aNi_{1-b-c}Mn_bX_cD^1_\alpha$ ($0.90 \leq a \leq 1.8$, $0 \leq b \leq 0.5$, $0 \leq c \leq 0.5$, $0 \leq \alpha \leq 2$); $Li_aNi_{1-b-c}Mn_bX_cO_{2-\alpha}T_\alpha$ ($0.90 \leq a \leq 1.8$, $0 \leq b \leq 0.5$, $0 \leq c \leq 0.5$, $0 \leq \alpha \leq 2$); $Li_aNi_{1-b-c}Mn_bX_cO_{2-\alpha}T_2$ ($0.90 \leq a \leq 1.8$, $0 \leq b \leq 0.5$, $0 \leq c \leq 0.5$, $0 \leq \alpha \leq 2$); $Li_aNi_bE_cG_dO_2$ ($0.90 \leq a \leq 1.8$, $0 \leq b \leq 0.9$, $0 \leq c \leq 0.5$, $0.001 \leq d \leq 0.1$); $Li_aNi_bCo_cL^1_dG_eO_2$ ($0.90 \leq a \leq 1.8$, $0 \leq b \leq 0.9$, $0 \leq c \leq 0.5$, $0 \leq d \leq 0.5$, $0 \leq e \leq 0.1$); $Li_aNiG_bO_2$ ($0.90 \leq a \leq 1.8$, $0.001 \leq b \leq 0.1$) $Li_aCoG_bO_2$ ($0.90 \leq a \leq 1.8$, $0.001 \leq b \leq 0.1$); $Li_aMn_{1-b}G_bO_2$ ($0.90 \leq a \leq 1.8$, $0.001 \leq b \leq 0.1$); $Li_aMn_2G_bO_4$ ($0.90 \leq a \leq 1.8$, $0.001 \leq b \leq 0.1$); $Li_aMn_{1-g}G_gPO_4$ ($0.90 \leq a \leq 1.8$, $0 < g \leq 0.5$); $QO_2$; $QS_2$; $LiQS_2$; $V_2O_5$; $LiV_2O_5$; $LiZO_2$; $LiNiVO_4$; $Li_{(3-f)}J_2 PO_{43}$ ($0 \leq f \leq 2$); $Li_{(3-f)}Fe_2 PO_{43}$ ($0 \leq f \leq 2$); $Li_aFePO_4$ ($0.90 \leq a \leq 1.8$)

In the above chemical formulas, A is selected from Ni, Co, Mn, or a combination thereof; X is selected from Al, Ni, Co, Mn, Cr, Fe, Mg, Sr, V, a rare earth element, or a combination thereof; $D^1$ is selected from O, F, S, P, or a combination thereof; E is selected from Co, Mn, or a combination thereof; T is selected from F, S, P, or a combination thereof; G is selected from Al, Cr, Mn, Fe, Mg, La, Ce, Sr, V, or a combination thereof; Q is selected from Ti, Mo, Mn, or a combination thereof; Z is selected from Cr, V, Fe, Sc, Y, or a combination thereof; J is selected from V, Cr, Mn, Co, Ni, Cu, or a combination thereof; $L^1$ is selected from Mn, Al, or a combination thereof.

The compounds may have a coating layer on the surface, or may be mixed with another compound having a coating layer. The coating layer may include at least one coating element compound selected from, e.g., an oxide of a coating element, a hydroxide of a coating element, an oxyhydroxide of a coating element, an oxycarbonate of a coating element, and a hydroxyl carbonate of a coating element. The compound for the coating layer may be amorphous or crystalline. The coating element included in the coating layer may include, e.g., Mg, Al, Co, K, Na, Ca, Si, Ti, V, Sn, Ge, Ga, B, As, Zr, or mixture thereof. The coating layer may be disposed in a method having no adverse influence on properties of a positive electrode active material by using these elements in the compound. For example, the method may include any suitable coating method, e.g., spray coating, dipping, and the like.

In the positive electrode, an amount of the positive active material may be about 90 wt % to about 98 wt %, based on a total weight of the positive active material layer.

In embodiments, the positive active material layer may further include a binder and a conductive material. The binder and the conductive material may be included in an amount of about 1 wt % to about 5 wt %, respectively, based on a total amount of the positive active material layer.

The binder improves binding properties of positive active material particles with one another and with a current collector. Examples of the binder may include polyvinyl alcohol, carboxymethyl cellulose, hydroxypropyl cellulose, diacetyl cellulose, polyvinylchloride, carboxylated polyvinylchloride, polyvinyl fluoride, an ethylene oxide-containing polymer, polyvinyl pyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, or the like, but is not limited thereto.

The conductive material is included to provide electrode conductivity, and any suitable electrically conductive material may be used as a conductive material unless it causes a chemical change. Examples of the conductive material may include a carbon-based material, e.g., natural graphite, artificial graphite, carbon black, acetylene black, ketjen black, a carbon fiber and the like, a metal-based material of a metal powder or a metal fiber including copper, nickel, aluminum, silver, and the like, a conductive polymer, e.g., a polyphenylene derivative, or a mixture thereof.

The current collector may include, e.g., Al. The electrolyte may include a non-aqueous organic solvent and a lithium salt.

The non-aqueous organic solvent serves as a medium for transmitting ions taking part in the electrochemical reaction of a battery. The non-aqueous organic solvent may include, e.g., a carbonate-based, ester-based, ether-based, ketone-based, alcohol-based, or aprotic solvent.

The carbonate-based solvent may include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), or the like, and the ester-based solvent may include methyl acetate, ethyl acetate, n-propyl acetate, dimethyl acetate, methyl propionate, ethyl propionate, propyl propionate, decanolide, valerolactone, mevalonolactone, caprolactone, or the like. The ether-based solvent may be dibutyl ether, tetraglyme, diglyme, dimethoxyethane, 2-methyltetrahydrofuran, 2,5-dimethyltetrahydrofuran, tetrahydrofuran, and the like, and the ketone-based solvent may include cyclohexanone, or the like. The alcohol-based solvent may include ethyl alcohol, isopropyl alcohol, and the like, and examples of the aprotic solvent include nitriles, e.g., R—CN (where R is a C2 to C20 linear, branched, or cyclic hydrocarbon, and may include a double bond, an aromatic ring, or an ether bond), amides, e.g., dimethylformamide, dioxolanes, e.g., 1,3-dioxolane, 1,4-dioxolane, sulfolanes, and the like.

The organic solvent may be used alone or in a mixture. If the organic solvent is used in a mixture, the mixture ratio may be controlled in accordance with a desirable battery performance.

When the non-aqueous organic solvent is mixed and used, a mixed solvent of a cyclic carbonate and a chain carbonate, a mixed solvent of a cyclic carbonate and a propionate-based solvent, or a mixed solvent of a cyclic carbonate, a chain carbonate, and a propionate-based solvent may be used. The propionate-based solvent may be methyl propionate, ethyl propionate, propyl propionate, or a combination thereof.

Herein, when the cyclic carbonate and the chain carbonate or the cyclic carbonate and the propionate-based solvent are mixed, they may be mixed in a volume ratio of about 1:1 to about 1:9, and thus, performance of an electrolyte solution may be improved. In addition, when the cyclic carbonate, the chain carbonate, and the propionate-based solvent are mixed, they may be mixed in a volume ratio of about 1:1:1 to about 3:3:4. The mixing ratios of the solvents may be appropriately adjusted according to desirable properties.

The organic solvent may further include an aromatic hydrocarbon-based solvent as well as the carbonate-based solvent. The carbonate-based solvent and aromatic hydrocarbon-based solvent may be mixed together in a volume ratio of about 1:1 to about 30:1. The aromatic hydrocarbon-based organic solvent may be an aromatic hydrocarbon-based compound represented by Chemical Formula 1.

[Chemical Formula 1]

In Chemical Formula 1, $R_1$ to $R_6$ are the same or different and are selected from hydrogen, a halogen, a C1 to C10 alkyl group, a haloalkyl group, and a combination thereof.

The aromatic hydrocarbon-based organic solvent may include, e.g., benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 2,3-difluorotoluene, 2,4-difluorotoluene, 2,5-difluorotoluene, 2,3,4-trifluorotoluene, 2,3,5-trifluorotoluene, chlorotoluene, 2,3-dichlorotoluene, 2,4-dichlorotoluene, 2,5-dichlorotoluene, 2,3,4-trichlorotoluene, 2,3,5-trichlorotoluene, iodotoluene, 2,3-diiodotoluene, 2,4-diiodotoluene, 2,5-diiodotoluene, 2,3,4-triiodotoluene, 2,3,5-triiodotoluene, xylene, or a combination thereof.

The electrolyte may further include vinylethyl carbonate, vinylene carbonate, an ethylene carbonate-based compound represented by Chemical Formula 2, as an additive for improving cycle life.

[Chemical Formula 2]

In Chemical Formula 2, $R_7$ and $R_8$ are the same or different and may each be independently hydrogen, a halogen, a cyano group (CN), a nitro group ($NO_2$), or a C1 to C5 fluoroalkyl group, provided that at least one of $R_7$ and $R_8$ is a halogen, a cyano group (CN), a nitro group ($NO_2$), or a C1 to C5 fluoroalkyl group, and $R_7$ and $R_8$ are not simultaneously hydrogen.

Examples of the ethylene carbonate-based compound may include difluoro ethylene carbonate, chloroethylene carbonate, dichloroethylene carbonate, bromoethylene carbonate, dibromoethylene carbonate, nitroethylene carbonate, cyanoethylene carbonate or fluoroethylene carbonate, or the like. An amount of the additive for improving the cycle-life characteristics may be used within an appropriate range.

The lithium salt dissolved in an organic solvent supplies a battery with lithium ions, basically operates the rechargeable lithium battery, and improves transportation of the lithium ions between a positive electrode and a negative electrode. Examples of the lithium salt include at least one or two supporting salt selected from $LiPF_6$, $LiBF_4$, $LiSbF_6$, $LiAsF_6$, $LiN(SO_2C_2F_5)_2$, $Li(CF_3SO_2)_2N$, $LiN(SO_3C_2F_5)_2$, $Li(FSO_2)_2N$ (lithium bis(fluorosulfonyl)imide: LiFSI), $LiC_4F_9SO_3$, $LiClO_4$, $LiAlO_2$, $LiAlCl_4$, $LiPO_2F_2$, $LiN(C_xF_{2x+1}SO_2)(C_yF_{2y+1}SO_2)$, wherein x and y are natural numbers, e.g., an integer of about 1 to about 20, lithium difluoro(bisoxolato) phosphate), LiCl, LiI, $LiB(C_2O_4)_2$ (lithium bis(oxalato) borate: LiBOB), or lithium difluoro (oxalato)borate (LiDFOB). A concentration of the lithium salt may range from about 0.1 M to about 2.0 M. If the lithium salt is included at the above concentration range, the electrolyte may have excellent performance and lithium ion mobility due to optimal electrolyte conductivity and viscosity.

A separator may be disposed between the positive electrode and the negative electrode depending on a type of a rechargeable lithium battery. The separator may include, e.g., polyethylene, polypropylene, polyvinylidene fluoride or multi-layers thereof having two or more layers. For example, the separator may be a mixed multilayer, e.g., a polyethylene/polypropylene double-layered separator, a polyethylene/polypropylene/polyethylene triple-layered separator, a polypropylene/polyethylene/polypropylene triple-layered separator, and the like.

Figure 1:
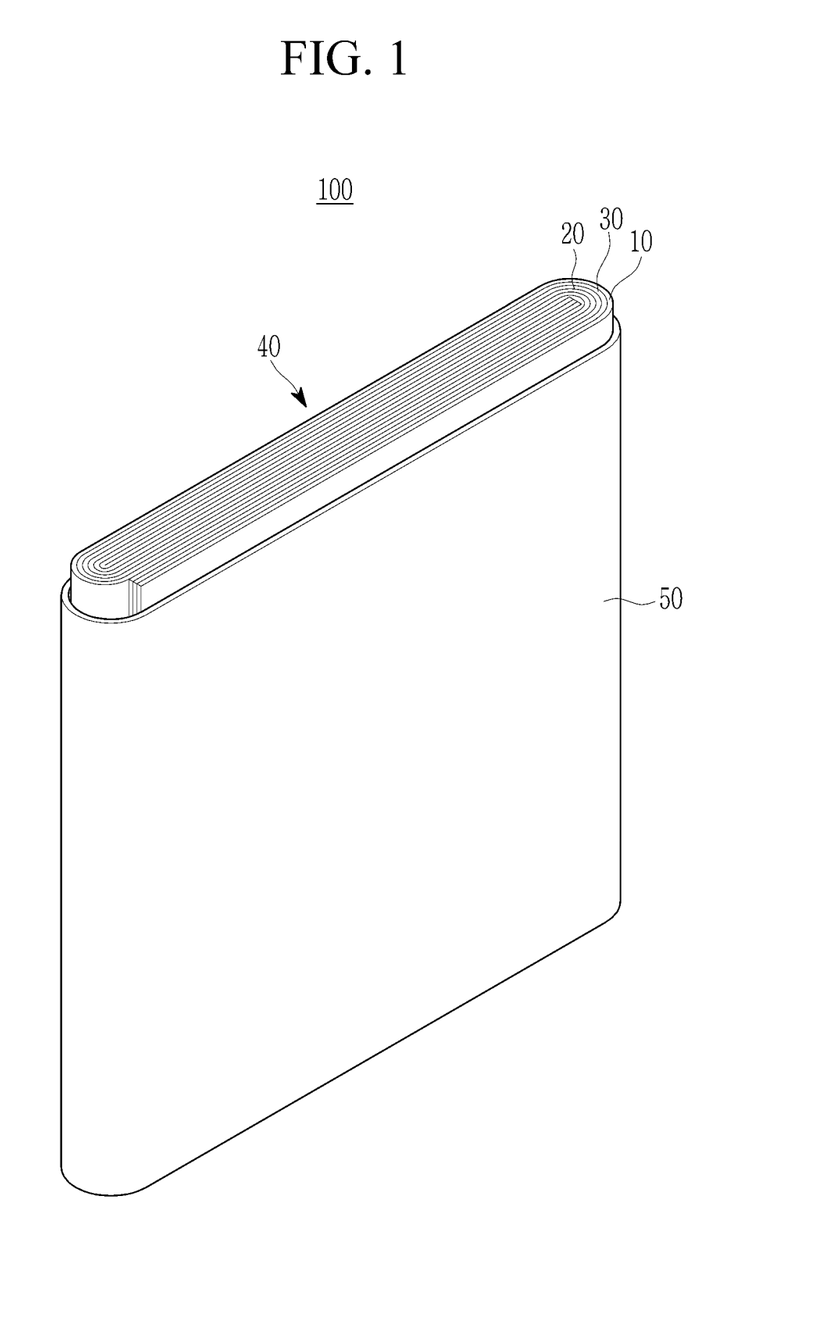
FIG. 1 is a schematic diagram showing a rechargeable lithium battery according to one or more embodiments.

FIG. 1 is an exploded perspective view of a rechargeable lithium battery according to an embodiment. The rechargeable lithium battery according to some embodiments is illustrated as a prismatic battery but may include other variously-shaped batteries, e.g., a cylindrical battery, a pouch battery, and the like.

Referring to FIG. 1, a rechargeable lithium battery 100 according to an embodiment may include an electrode assembly 40 manufactured by winding a separator 30 disposed between a positive electrode 10 and a negative electrode 20, and a case 50 housing the electrode assembly 40. An electrolyte may be impregnated in the positive electrode 10, the negative electrode 20, and the separator 30.

The following Examples and Comparative Examples are provided in order to highlight characteristics of one or more embodiments, but it will be understood that the Examples and Comparative Examples are not to be construed as limiting the scope of the embodiments, nor are the Comparative Examples to be construed as being outside the scope of the embodiments. Further, it will be understood that the embodiments are not limited to the particular details described in the Examples and Comparative Examples.

Example 1

Silicon-carbon composite and a cetrimonium bromide (CTAB) dispersant were mixed in an ethanol solvent and sufficiently shaken.

The silicon-carbon composite included an agglomerated product, secondary particles in which silicon nano particles with an average particle diameter of 100 nm were agglomerated, and a soft carbon coating layer formed on the surface of the agglomerated product, and an amount of the silicon nano particles was 60 wt % and the amount of soft carbon was 40 wt %, based on a total 100 wt % of the silicon-carbon composite. A thickness of the soft carbon coating layer was 100 nm.

Pyrogallol was added to the shaken product, shaken for 1 hour, and polyethyleneimine and tris buffer were added thereto followed by shaking for 15 minutes to prepare a mixture. The tris buffer was used, which was prepared by adding tris(hydroxymethyl)aminomethane to water. Powder was collected by using a vacuum filtration equipment.

In the mixing process, based on a total 100 wt % of the mixture, an amount of the silicon-carbon composite was 97 wt %, an amount of the dispersant was 1 wt %, an amount of pyrogallol was 1 wt %, and an amount of polyethyleneimine was 1 wt %.

The powder was heat-treated at 150° C. for 12 hours to prepare a negative active material. The prepared negative active material included the silicon-carbon composite and the polymer coating layer with the cross-linked structure positioned on the surface of the silicon-carbon composite.

97.5 wt % of the negative active material, 1.5 wt % of carboxymethyl cellulose, and 1 wt % of a styrene butadiene rubber, based on 100 wt % of negative active material layer slurry, were mixed in a water solvent to prepare the negative active material layer slurry. The negative active material layer slurry was coated on a Cu foil current collector, dried, and pressurized to prepare a negative active material layer, thereby obtaining a negative electrode.

Using the negative electrode, a lithium metal counter electrode, and an electrolyte, a half-cell was fabricated by a general procedure. The electrolyte used was a 1 M $LiPF_6$ dissolved in a mixed solvent of ethylene carbonate and dimethyl carbonate (3:7 volume ratio).

Example 2

A negative active material was prepared by the same procedure as in Example 1, except that a time for shaking after adding polyethyleneimine and tris buffer was changed from 15 minutes to 30 minutes. The prepared negative active material was used to fabricate a half-cell by the same procedure as in Example 1.

Example 3

A negative active material was prepared by the same procedure as in Example 1, except that a time for shaking after adding polyethyleneimine and tris buffer was changed from 15 minutes to 1 hour. The prepared negative active material was used to fabricate a half-cell by the same procedure as in Example 1.

Example 4

A negative active material was prepared by the same procedure as in Example 1, except that a time for shaking after adding polyethyleneimine and tris buffer was changed from 15 minutes to 2 hours. The prepared negative active material was used to fabricate a half-cell by the same procedure as in Example 1.

Example 5

A negative active material was prepared by the same procedure as in Example 1, except that a time for shaking after adding polyethyleneimine and tris buffer was changed from 15 minutes to 4 hours. The prepared negative active material was used to fabricate a half-cell by the same procedure as in Example 1.

Example 6

A negative active material was prepared by the same procedure as in Example 1, except that a time for shaking after adding polyethyleneimine and tris buffer was changed from 15 minutes to 8 hours. The prepared negative active material was used to fabricate a half-cell by the same procedure as in Example 1.

Example 7

A negative active material was prepared by the same procedure as in Example 1, except that a time for shaking after adding polyethyleneimine and tris buffer was changed from 15 minutes to 12 hours. The prepared negative active material was used to fabricate a half-cell by the same procedure as in Example 1.

Example 8

A negative active material was prepared by the same procedure as in Example 1, except that in the mixing process, based on a total 100 wt % of the mixture, an amount of the silicon-carbon composite was 95 wt %, an amount of the dispersant was 1 wt %, an amount of pyrogallol was 2 wt %, and an amount of polyethyleneimine was 2 wt %. The prepared negative active material was used to fabricate a half-cell by the same procedure as in Example 1.

Example 9

A negative active material was prepared by the same procedure as in Example 8, except that a time for shaking after adding polyethyleneimine and tris buffer was changed from 15 minutes to 30 minutes. The prepared negative active material was used to fabricate a half-cell by the same procedure as in Example 1.

Example 10

A negative active material was prepared by the same procedure as in Example 8, except that a time for shaking after adding polyethyleneimine and tris buffer was changed from 15 minutes to 1 hour. The prepared negative active material was used to fabricate a half-cell by the same procedure as in Example 1.

Example 11

A negative active material was prepared by the same procedure as in Example 8, except that a time for shaking after adding polyethyleneimine and tris buffer was changed from 15 minutes to 2 hours. The prepared negative active material was used to fabricate a half-cell by the same procedure as in Example 1.

Example 12

A negative active material was prepared by the same procedure as in Example 8, except that a time for shaking after adding polyethyleneimine and tris buffer was changed from 15 minutes to 4 hours. The prepared negative active material was used to fabricate a half-cell by the same procedure as in Example 1.

Example 13

A negative active material was prepared by the same procedure as in Example 8, except that a time for shaking after adding polyethyleneimine and tris buffer was changed from 15 minutes to 8 hours. The prepared negative active material was used to fabricate a half-cell by the same procedure as in Example 1.

Comparative Example 1

A half-cell was fabricated by the same procedure as in Example 1, except that the silicon-carbon composite was used as a negative active material.

Comparative Example 2

A negative active material was prepared by the same procedure as in Example 1, except that polyethyleneimine and tris buffer were added to the shaken product. That is, pyrogallol was not used and polyethyleneimine was only used.

Comparative Example 3

A negative active material was prepared by the same procedure as in Example 1, except that pyrogallol was added to the shaken product to sufficiently shake, and then tris buffer was added thereto. That is, polyethyleneimine was not used and pyrogallol was only used.

Experimental Example 1: Measurements of XPS and FT-IR

Figure 2:
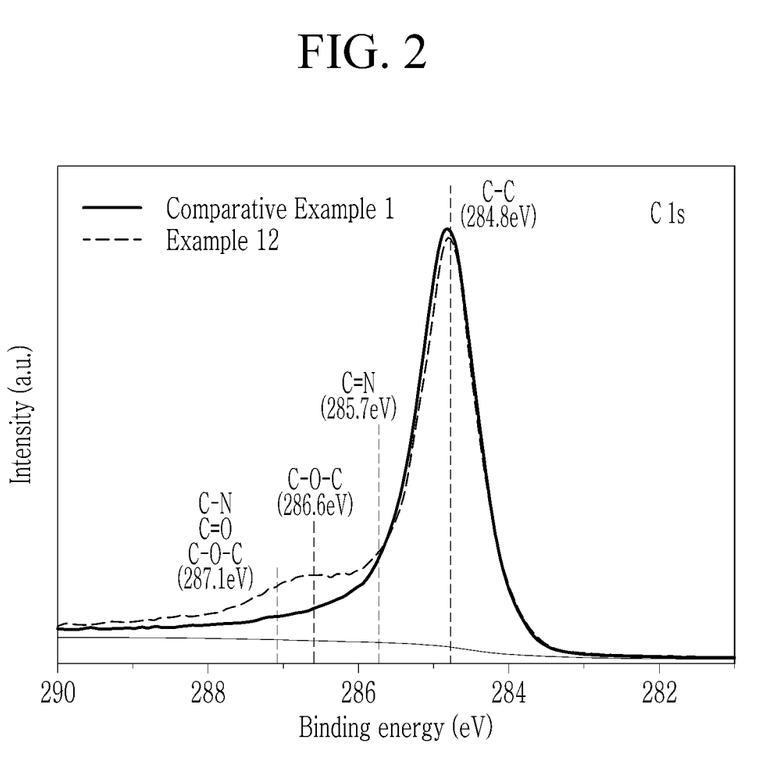
FIG. 2 is a graph showing a C1s spectrum of the negative active materials of Example 12 and Comparative Example 1.
Figure 3:
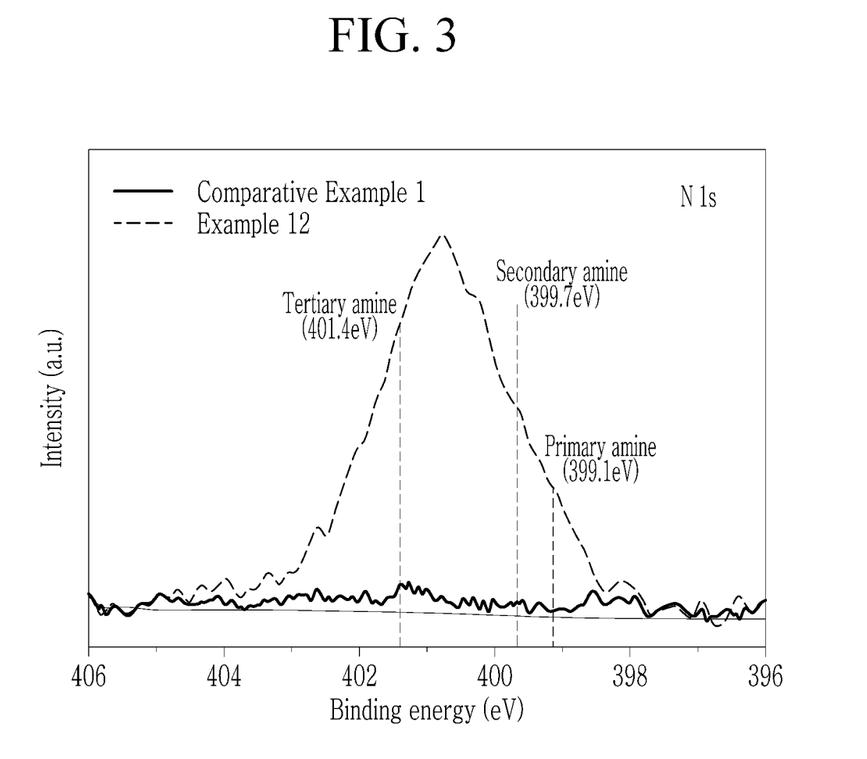
FIG. 3 is a graph showing a N1s spectrum of the negative active materials of Example 12 and Comparative Example 1.

An X-ray photoelectron analysis (XPS) C1s spectrum and N1s spectrum for the negative active materials of Examples 1 to 13 and Comparative Examples 1 to 3 were measured. Among the results, the C1s spectrum results of Example 12 and Comparative Example 1 are shown in FIG. 2 and the N1s spectrum results thereof are shown in FIG. 3, respectively.

Figure 4:
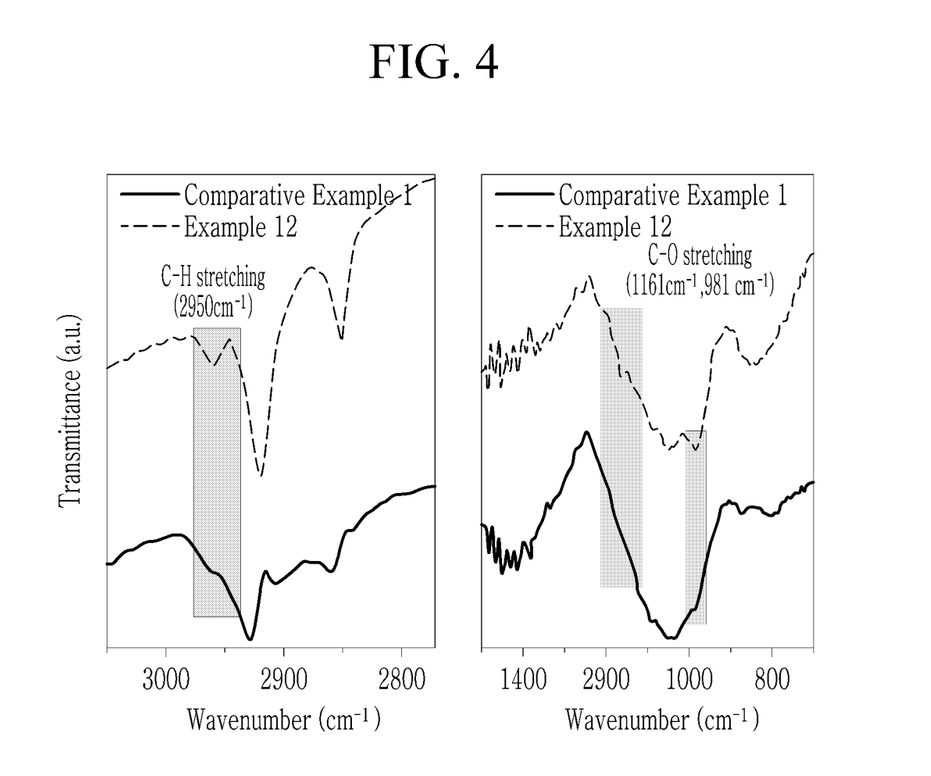
FIG. 4 is a graph showing FT-IR results of the negative active materials of Example 12 and Comparative Example 1.

FT-IR was measured for the negative active materials of Examples 1 to 13 and Comparative Examples 1 to 3. Among the results, the results of Example 12 and Comparative Example 1 are shown in FIG. 4. As shown in FIG. 4, the negative active material of Example 12 appeared a C—H stretching peak at 2950 $cm^{-1}$, but the negative active material of Comparative Example 1 did not appear this peak. The negative active material of Example 12 appeared a C—O stretching peak at 981 $cm^{-1}$ and 1161 $cm^{-1}$, but the negative active material of Comparative Example 1 did not appear this peak.

Experimental Example 2: Evaluation of Cycle-Life Characteristics

The half-cells of Examples 1 to 13 and Comparative Examples 1 to 3 were charged and discharged at 1.0 C. A ratio of the discharge capacity at each cycle relative to the discharge capacity at $1^{st}$ was calculated. The number of cycles at which the ratio of capacity was abruptly dropped to less than 80% are as shown in Table 1, as the cycle-life abrupted drop point.

Table 1 showed that the total agitating time, the amounts of pyrogarrol (PG) and polyethyleneimine (PEI) used, an amount of the coating layer, whether heat treatments was performed or not, a ratio (N peak ratio) of the height of a peak related to N1s occurring at 400 eV of a binding energy relative to the height of a peak related to Nis occurring at 405 eV, and a ratio (C peak ratio) of the height of a peak related to CIs occurring at 286.5 eV relative to the height of a peak related to CIs occurring at 290 eV.

TABLE 1

|  | Total time for agitating | PG amount (wt %) | PEI amount (wt %) | Amount of coating layer(wt %) | Performance or no of heat treatment | Cycle-life abrupted drop point (No.) | N peak ratio (%) | C peak ratio (%) |
|---|---|---|---|---|---|---|---|---|
| Comparative Example 1 | — | — | — | 0 | X | 200 | 1 | 1 |
| Example 1 | 15 minutes | 1 | 1 | 0.26 | ○ | 240 | 1.02 | 1.02 |
| Example 2 | 30 minutes | 1 | 1 | 0.3 | ○ | 250 | 1.03 | 1.04 |
| Example 3 | 1 hour | 1 | 1 | 0.50 | ○ | 300 | 1.05 | 1.6 |

TABLE 1-continued

|  | Total time for agitating | PG amount (wt %) | PEI amount (wt %) | Amount of coating layer(wt %) | Performance or no of heat treatment | Cycle-life abrupted drop point (No.) | N peak ratio (%) | C peak ratio (%) |
|---|---|---|---|---|---|---|---|---|
| Example 4 | 2 hours | 1 | 1 | 0.63 | ○ | 410 | 1.1 | 1.8 |
| Example 5 | 4 hours | 1 | 1 | 0.81 | ○ | 480 | 1.25 | 1.98 |
| Example 6 | 8 hours | 1 | 1 | 1.05 | ○ | 500 | 1.35 | 2.1 |
| Example 7 | 12 hours | 1 | 1 | 1.22 | ○ | 535 | 1.4 | 2.4 |
| Example 8 | 15 minutes | 2 | 2 | 0.34 | ○ | 260 | 1.04 | 1.5 |
| Example 9 | 30 minutes | 2 | 2 | 0.34 | ○ | 260 | 1.04 | 1.5 |
| Example 10 | 1 hour | 2 | 2 | 0.56 | ○ | 302 | 1.08 | 1.7 |
| Example 11 | 2 hours | 2 | 2 | 0.64 | ○ | 415 | 1.1 | 1.8 |
| Example 12 | 4 hours | 2 | 2 | 1.20 | ○ | 550 | 1.4 | 2.37 |
| Example 13 | 8 hours | 2 | 2 | 1.77 | ○ | 300 | 1.5 | 3 |
| Comparative Example 2 | 15 minutes | — | 1 | 0.15 | ○ | 200 | 1.01 | 1 |
| Comparative Example 3 | 15 minutes | 1 | — | 0.19 | ○ | 200 | 1 | 1.01 |

As shown in Table 1, the cycle-life was abruptly dropped at 240 cycles or more in Examples 1 to 13, and at 200 cycles in Comparative Examples 1 to 3. The cycle-life characteristics of Examples 1 to 13 is superior to those of Comparative Example 1 to 3.

By way of summation and review, one or more embodiments provide a negative active material and a rechargeable lithium battery including the same. The negative active material exhibits suppressed side reactions with an electrolyte, thereby exhibiting excellent cycle-life characteristics. The negative active material also exhibits high strength and excellent kinetic performances.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A negative active material, comprising:
a core comprising a silicon-carbon composite; and
a polymer coating layer on the core,
wherein the negative active material has about 1.02 to about 1.6 of a ratio of height of N1s peak occurring at about 400±about 0.5 eV relative to a height of N1s peak occurring at about 405±about 0.5 eV of a bonding energy, and about 1.02 to about 3.0 of a ratio of a height of a C1s peak occurring at about 286.5±about 0.5 eV relative to a height of C1s peak occurring at about 290±about 0.5 eV when an X-ray photoelectron spectroscopy is measured.

2. The negative active material as claimed in claim 1, wherein the ratio of the height of the C1s peak appearing at about 286.5±about 0.5 eV relative to the height of the C1s peak appearing at about 290±about 0.5 eV of the bonding energy is about 1.03 to about 2.7, when the X-ray photoelectron spectroscopy is measured.

3. The negative active material as claimed in claim 1, wherein the silicon-carbon composite comprises silicon nano particles and an amorphous carbon coating layer positioned on a surface of the silicon nano particles.

4. The negative active material as claimed in claim 1, wherein the silicon-carbon composite further comprises crystalline carbon.

5. The negative active material as claimed in claim 1, wherein the polymer coating layer includes a cross-linked polymer of a phenol group-included first repeating unit and an amine group-included second repeating unit.

6. The negative active material as claimed in claim 5, wherein the phenol group-included first repeating unit is derived from a phenol compound with two or three OH groups.

7. The negative active material as claimed in claim 6, wherein the phenol compound comprises pyrogallol, catechol, resorcinol, hydroquinone, phloroglucinol, or a combination thereof.

8. The negative active material as claimed in claim 5, wherein the amine group-included second repeating unit is derived from an amine compound having two or three amine groups.

9. The negative active material as claimed in claim 8, wherein the amine compound comprises polyethyleneimine, diethylenetriamine, triethylenetetramine, or a combination thereof.

10. The negative active material as claimed in claim 1, wherein an amount of the polymer coating layer is about 0.2 wt % to about 2 wt % based on a total weight of 100 wt % of the negative active material.

11. The negative active material as claimed in claim 1, wherein the polymer coating layer has a thickness of about 1 nm to about 10 nm.

12. The negative active material as claimed in claim 1, wherein the negative active material is a mixing product of the silicon-carbon composite, a phenol compound with two to three OH groups, and an amine compound having three or more amine groups, the mixing product comprising a cross-linked structure.

13. The negative active material as claimed in claim 12, wherein the cross-linked structure is a heat treatment product.

14. The negative active material as claimed in claim 1, wherein the negative active material has a C—H peak appearing at a wavelength of about 2940 $cm^{-1}$ to about 3000 $cm^{-1}$, a C—O first peak appearing at a wavelength of about 980 $cm^{-1}$ to about 990 $cm^{-1}$, and a C—O second peak appearing at about 1150 $cm^{-1}$ to about 1200 $cm^{-1}$ in a FT-IR analysis graph.

15. A rechargeable lithium battery, comprising:
a negative electrode comprising the negative active material as claimed in claim 1;
a positive electrode; and
an electrolyte.

* * * * *